(12) United States Patent
Bedolla

(10) Patent No.: US 9,348,426 B2
(45) Date of Patent: May 24, 2016

(54) METHOD AND APPARATUS PERTAINING TO WEB-COUPLED KEYBOARD KEYS

(71) Applicant: BlackBerry Limited, Waterloo (CA)

(72) Inventor: Jimmy Bedolla, Elgin, IL (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/896,096

(22) Filed: May 16, 2013

(65) Prior Publication Data

US 2014/0341630 A1  Nov. 20, 2014

(51) Int. Cl.
*G06F 3/02* (2006.01)
*H01H 13/04* (2006.01)
*H01H 13/702* (2006.01)
*H01H 13/70* (2006.01)
*H01H 13/06* (2006.01)

(52) U.S. Cl.
CPC ............. *G06F 3/0219* (2013.01); *H01H 13/04* (2013.01); *G06F 3/02* (2013.01); *H01H 13/06* (2013.01); *H01H 13/70* (2013.01); *H01H 13/702* (2013.01)

(58) Field of Classification Search
CPC ... H01H 13/04; H01H 13/06; H01H 13/7065; H01H 2223/044; G06F 3/02; B41J 5/102
USPC ............. 400/472, 490, 493, 713, 714, 489; 200/314, 310; 361/679.11, 679.14, 361/679.15, 679.16
See application file for complete search history.

(56) References Cited

U.S. PATENT DOCUMENTS

| | | | |
|---|---|---|---|
| 7,070,349 B2 | 7/2006 | Dombrowski et al. | |
| 7,388,576 B2 | 6/2008 | Griffin et al. | |
| 8,330,725 B2 | 12/2012 | Mahowald et al. | |
| 2003/0108375 A1* | 6/2003 | Nichol et al. | 400/490 |
| 2010/0032272 A1 | 2/2010 | Chiang | |
| 2012/0012448 A1 | 1/2012 | Pance et al. | |
| 2012/0073941 A1 | 3/2012 | Chen | |

FOREIGN PATENT DOCUMENTS

WO  2008/078143 A1  7/2008

* cited by examiner

*Primary Examiner* — Jill Culler
*Assistant Examiner* — Quang X Nguyen
(74) *Attorney, Agent, or Firm* — Jon Gibbons; Fleit Gibbons Gutman Bongini & Bianco P.L.

(57) ABSTRACT

A plurality of keyboard keys are grouped into at least a first group of keyboard keys and a second group of keyboard keys. Webbing serves to physically couple together the keyboard keys of the first group of keyboard keys. Similarly, but discretely, webbing also serves to physically couple together the keyboard keys of the second group of keyboard keys. So configured, the keyboard keys of the first group are not physically coupled via such webbing to any keyboard keys of the second group. By one approach the aforementioned webbing comprises an integral part of the keyboard keys and comprises, for example, a part of a film that conformally overlies adjacent ones of the keyboard keys. These teachings will accommodate forming such a film and the main body of the keyboard keys using thermoforming and injection molding processes to form-in-place such keys.

17 Claims, 3 Drawing Sheets

METHOD AND APPARATUS PERTAINING TO WEB-COUPLED KEYBOARD KEYS

RELATED APPLICATIONS

This application is related to co-pending and co-owned U.S. patent application Ser. No. 13/896,119, entitled method and apparatus pertaining to a keyboard cover having light-masking paint and filed on even date herewith, which is incorporated by reference in its entirety herein.

This application is also related to co-pending and co-owned U.S. patent application Ser. No. 13/881,315, entitled method and apparatus pertaining to reversed thermo-formed film and filed on even date herewith, which is incorporated by reference in its entirety herein.

FIELD OF TECHNOLOGY

The present disclosure relates generally to electronic devices and more particularly to electronic devices having physical keyboards.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers and tablets/pads with wireless 802.11 or Bluetooth capabilities.

Portable electronic devices are generally intended for handheld use and ease of portability. Smaller devices are generally desirable for portability. In addition to a display (which may or may not comprise a touch-sensitive display) some portable electronic devices include a physical (i.e., mechanical) keyboard (as versus a so-called virtual keyboard) to facilitate the entry of various alphanumeric and other characters.

The look and feel of such keyboards is important to the user. For example, character artwork on the assertable surfaces of keyboard keys is preferably sharp and well defined. At the same time, many keyboards must serve in highly cost-constrained application settings that preclude the use of materials and/or processing techniques that tend to readily provide a desired look and feel.

DETAILED DESCRIPTION

The following describes an apparatus and method pertaining to a plurality of keyboard keys that are grouped into at least a first group of keyboard keys and a second group of keyboard keys. Webbing serves to physically couple together the keyboard keys of the first group of keyboard keys. Similarly, but discretely, webbing also serves to physically couple together the keyboard keys of the second group of keyboard keys. So configured, the keyboard keys of the first group are not physically coupled via such webbing to any keyboard keys of the second group.

By one approach the aforementioned webbing comprises an integral part of the keyboard keys and comprises, for example, a part of a film that conformally overlies adjacent ones of the keyboard keys. These teachings will accommodate, for example, forming such a film and the main body of the keyboard keys using thermoforming and injection molding processes to form-in-place such keys.

By one approach the webbing comprises only a minor portion of the area between adjacent keys. So configured, adjacent keys that are physically coupled by webbing are nevertheless more physically separated than coupled.

By one approach the webbing for any given group of keyboard keys is coaxially aligned. If desired, this coaxially-aligned series of webbings are disposed proximal to a top edge of each keyboard key where keyboard keys of a given group are horizontally aligned as a row.

These teachings are highly flexible in practice and will accommodate a variety of modifications. By one approach, for example, each of the keyboard keys can further comprise a film-based flange that is disposed about the base periphery of the keyboard key. So configured, the aforementioned webbing can physically connect to (and can even be an integral part of) such flanges.

These teachings are also highly scalable and will accommodate use with a variety of differently-sized and/or differently-shaped keyboard keys and keyboards having various key layouts. The approaches described herein can also be employed using a variety of different materials and colors.

The aforementioned webbing can serve to connect each row of keys for a given keyboard to thereby facilitate and ease constructing the keyboard while also helping to ensure that the pre-lettered keys are properly placed in the keyboard. At the same time, the described webbing provides only minimal lateral physically coupling between adjacent keys (and completely avoids vertical physical coupling with the keys of adjacent rows), thus preserving a good independent feel to each key's action.

These teachings are also very well suited to use with form-in-place (FIP) films and thermoplastic molding techniques. So configured, a high quality keyboard can be realized at a relatively modest price as FIP films will support high-quality artwork while avoiding the higher costs often associated with the materials and techniques that offer similar quality in these regards.

Figure 4:
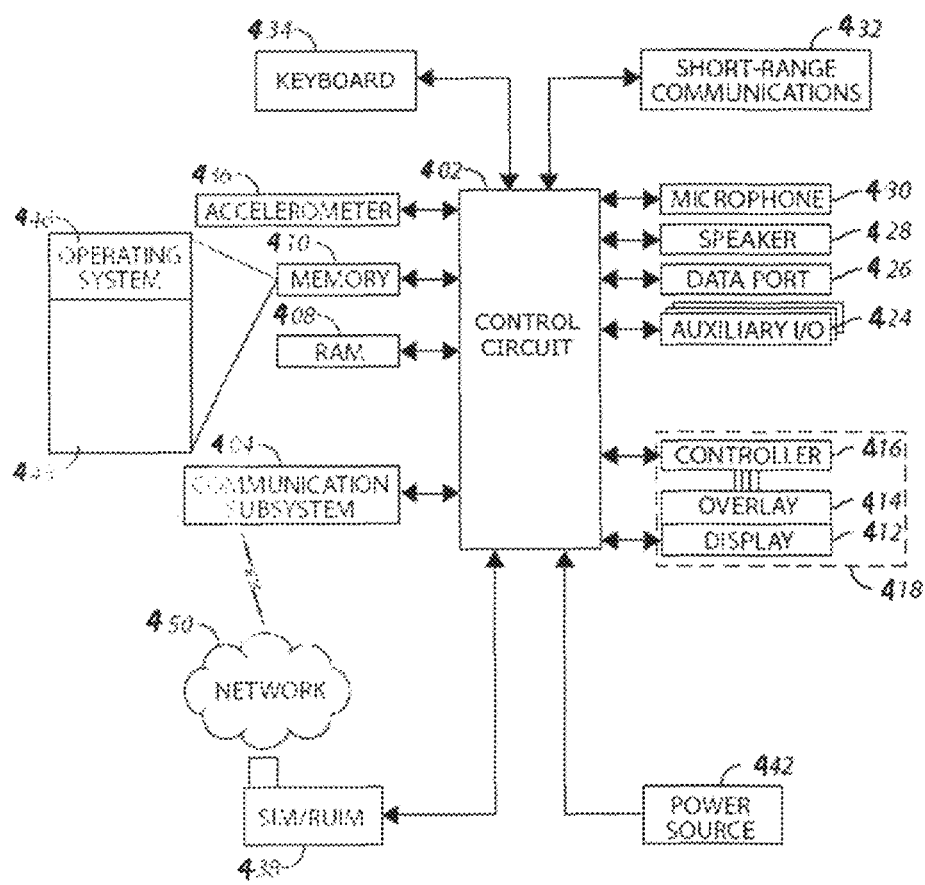
FIG. 4 is a block diagram in accordance with the disclosure.

Such a plurality of keys 100 can serve well in a portable electronic device. Referring to FIG. 4, an exemplary portable electronic device includes a control circuit 402 that controls the overall operation of the portable electronic device. In this particular illustrative example the portable electronic device comprises a portable communications device. Corresponding communication functions, including data and voice communications, are performed through a communication subsystem 404. The communication subsystem receives messages from and sends messages to a wireless network 450.

The wireless network 450 may be any type of wireless network, including, but not limited to, a wireless data networks, a wireless voice network, or a network that supports both voice and data communications. The control circuit 402 may also operably couple to a short-range communication subsystem 432 (such as an 802.11 or 802.16-compatible transceiver and/or a Bluetooth™-compatible transceiver). To identify a subscriber for network access, the portable electronic device may utilize a Subscriber Identity Module or a Removable User Identity Module (SIM/RUIM) card 438 for communication with a network, such as the wireless network 450. Alternatively, user identification information may be programmed into a memory 410.

A power source 442, such as one or more rechargeable batteries or a port to an external power supply, powers the electronic device. The control circuit 402 may interact with an accelerometer 436 that may be utilized to detect direction of gravitational forces or gravity-induced reaction forces. The control circuit 402 also interacts with a variety of other components, such as a Random Access Memory (RAM) 408, a memory 410, an auxiliary input/output (I/O) subsystem 424, a data port 426, a speaker 428, a microphone 430, and other device subsystems 434 of choice.

A display 412 can be disposed in conjunction with a touch-sensitive overlay 414 that operably couples to an electronic controller 416. Together these components can comprise a touch-sensitive display 418 that serves as a graphical-user interface. Information, such as text, characters, symbols, images, icons, and other items may be displayed on the touch-sensitive display 418 via the control circuit 402.

The touch-sensitive display 418 may employ any of a variety of corresponding technologies including but not limited to capacitive, resistive, infrared, surface acoustic wave (SAW), strain gauge, optical imaging, dispersive signal technology, and/or acoustic pulse recognition-based touch-sensing approaches as are known in the art. If the touch-sensitive display 418 should utilize a capacitive approach, for example, the touch-sensitive overlay 414 can comprise a capacitive touch-sensitive overlay 414. In such a case the overlay 414 may be an assembly of multiple stacked layers including, for example, a substrate, a ground shield layer, a barrier layer, one or more capacitive touch sensor layers separated by a substrate or other barrier, and a cover. The capacitive touch sensor layers may comprise any suitable material, such as indium tin oxide (ITO).

The portable electronic device includes an operating system 446 and software programs, applications, or components 448 that are executed by the control circuit 402 and are typically stored in a persistent, updatable store such as the memory 410. Additional applications or programs may be loaded onto the portable electronic device through the wireless network 450, the auxiliary I/O subsystem 424, the data port 426, or the short-range communications subsystem 432. The memory 410 may comprise a non-transitory storage media that stores executable instructions which, when executed, causes one or more of the functions, steps, or actions described herein.

As a communication device, a received signal such as a text message, an e-mail message, or web page download is processed by the communication subsystem and input to the control circuit 402. The control circuit 402 processes the received signal for output to the display 412 and/or to the auxiliary I/O subsystem 424. A user may generate data items, for example e-mail messages, that may be transmitted over the wireless network 450 through the communication subsystem. For voice communications, the overall operation of the portable electronic device is similar. The speaker 428 outputs audible information converted from electrical signals, and the microphone 430 converts audible information into electrical signals for processing.

The control circuit 402 further operably couples in this illustrative example to a keyboard 434 that includes the aforementioned plurality 100 of keys. This keyboard 434 can comprise, for example, a QWERTY keyboard that includes a complete set of alphabetic characters along with various numerals, grammatical symbols, and so forth as desired.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

Figure 1:
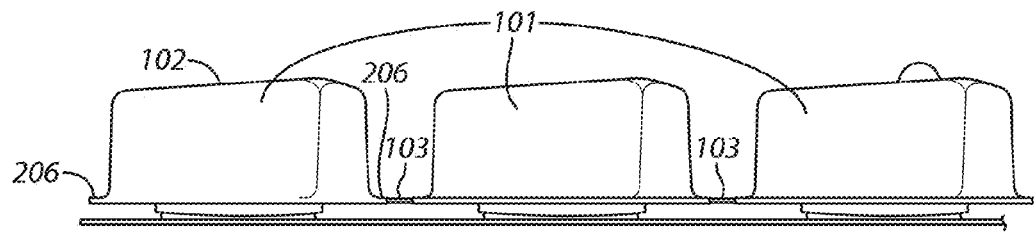
FIG. 1 is a front elevational view in accordance with the disclosure.

FIG. 1 presents a front view of a plurality 100 of keyboard keys 101 that comport with the present teachings. In this particular illustrative example the individual keys 101 have certain attributes of form (such as two inclined surfaces on the upper portion of the key) that are provided for the sake of an example. It will be understood that no particular limitations as regards these teachings are implied by way of such specificity.

In this example each key 101 includes a film 102 that conformally overlies both the key 102 and at least some adjacent keys 101. This film 102 can comprise, for example, a polyethylene terephthalate (PET) film that is used in a thermoforming process with an injection molding process to form-in-place (FIP) individual keys 101 having a resin interior and the aforementioned film exterior. Such manufacturing techniques are well known in the art and therefore are not described here in more detail.

Figure 2:
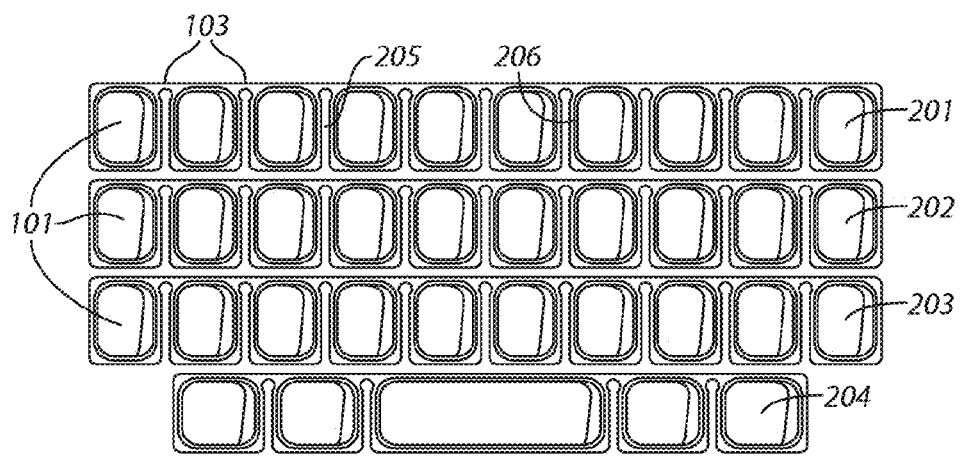
FIG. 2 is a top plan view in accordance with the disclosure.

As shown in both FIGS. 1 and 2, webbing 103 is disposed between horizontally-adjacent keys 101 to physically couple those horizontally-adjacent keys 101 to one another. As is particularly clear from FIG. 2, there is no such webbing or other physical connection in the vertical direction (i.e., between rows or groups). Instead, the aforementioned webbing 103 serves to create four physically-discrete groups 201-204 of keyboard keys 101 where the keys 101 of each group are physically coupled as a group but where each group is physically discrete from any of the other groups of keys 101. So configured, for example, a first group 201 of such keys 101 (comprising an uppermost row of keys 101 for a corresponding keyboard) is not physically coupled to the second group 202 of keys 101 that is disposed immediately adjacent that first group 201 of keys 101.

By one approach the aforementioned webbing 103 comprises a part of the aforementioned film 102 and hence comprises an integral part of the keyboard keys 101 themselves. In this case, the initial result of the thermoforming process would likely have that film 102 completely filling the spaces between adjacent keys 101. By one approach, however, the webbing 103 between keys 101 comprises only a minor portion of the space 205 available between the keys 101. For example, the webbing 103 might comprise no more than about ten percent of that available space 205.

The excess between-keys film 102 can be removed using any of a variety of approaches including, for example, laser cutting and/or die-based cutting. By one approach the remaining webbing 103 for any given group of keys 101 is coaxially disposed with respect to itself (that is, each individual web 103 is coaxially oriented with all the other webs 103 for that given group of keys 101). Generally speaking, for many application settings it will be useful to locate these webs 103 along either the top edge of the keys 101 (as illustrated) or along the bottom edge thereof.

So configured, during manufacture each row of keys 101 can be readily picked and placed as a row. Since the keys 101 likely already have their corresponding character artwork formed thereon, the various rows can be readily distinguished from one another by that artwork. This combination of row-based webbing and keycap artwork can greatly help to ensure that the keys are correctly located on the keyboard (thus avoiding the greater likelihood of error that arises when each key must be individually placed).

Figure 3:
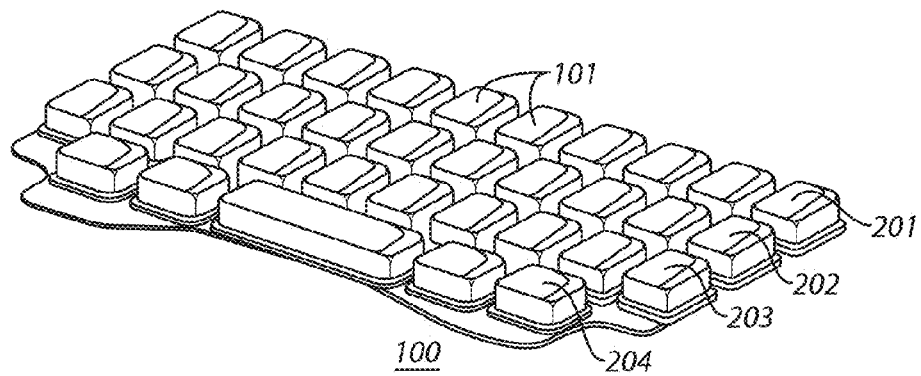
FIG. 3 is a perspective view in accordance with the disclosure.

Referring to both FIGS. 2 and 3, these teachings can serve to provide a plurality of keyboard keys 101 arranged into four distinct rows of keyboard keys 101, where webbing 103 disposed between adjacent keyboard keys 101 of each row physically couples the keys 101 of each row as a group. The minimal size of the webbing 103 permits great freedom of motion with respect to each key 101 and contributes to ease of placement as well as good action and user feel during use. The lack of webbing between rows further contributes to that freedom of motion and ease of placement. To some extent, each key 101 can more-or-less pivot about the webbing 103 which further contributes to the aforementioned freedom of motion.

These teachings are highly flexible in practice. For example, and as illustrated in FIGS. 1 and 2, by one approach a film-based flange 206 can be disposed about the base of each key 101. In particular, this flange 206 can be comprised of the same film 102 that forms the webbing 103. Such a flange 206 can contribute to the prevention of light leakage as may arise from backlighting the keys 101. Also, at least in some cases, such a flange 206 can aid in limiting key movement in the +Z direction while the webbing 103 nevertheless permits some key movement in the −Z direction.

As another example, a keyboard film formed using thermoforming typically has an outer/upper surface that is rougher than the inner/lower surface thereof. If desired, however, that configuration can be inverted such that the inner/lower surface is rougher than the outer/upper surface.

Such keys 101 can serve well in a portable electronic device. Referring to FIG. 4, an exemplary portable electronic device includes a control circuit 402 that controls the overall operation of the portable electronic device. In this particular illustrative example the portable electronic device comprises a portable communications device. Corresponding communication functions, including data and voice communications, are performed through a communication subsystem 404. The communication subsystem receives messages from and sends messages to a wireless network 450.

The wireless network 450 may be any type of wireless network, including, but not limited to, a wireless data networks, a wireless voice network, or a network that supports both voice and data communications. The control circuit 402 may also operably couple to a short-range communication subsystem 432 (such as an 802.11 or 802.16-compatible transceiver and/or a Bluetooth™-compatible transceiver). To identify a subscriber for network access, the portable electronic device may utilize a Subscriber Identity Module or a Removable User Identity Module (SIM/RUIM) card 438 for communication with a network, such as the wireless network 450. Alternatively, user identification information may be programmed into a memory 410.

A power source 442, such as one or more rechargeable batteries or a port to an external power supply, powers the electronic device. The control circuit 402 may interact with an accelerometer 436 that may be utilized to detect direction of gravitational forces or gravity-induced reaction forces. The control circuit 402 also interacts with a variety of other components, such as a Random Access Memory (RAM) 408, a memory 410, an auxiliary input/output (I/O) subsystem 424, a data port 426, a speaker 428, a microphone 430, and other device subsystems 434 of choice.

A display 412 can be disposed in conjunction with a touch-sensitive overlay 414 that operably couples to an electronic controller 416. Together these components can comprise a touch-sensitive display 418 that serves as a graphical-user interface. Information, such as text, characters, symbols, images, icons, and other items may be displayed on the touch-sensitive display 418 via the control circuit 402.

The touch-sensitive display 418 may employ any of a variety of corresponding technologies including but not limited to capacitive, resistive, infrared, surface acoustic wave (SAW), strain gauge, optical imaging, dispersive signal technology, and/or acoustic pulse recognition-based touch-sensing approaches as are known in the art. If the touch-sensitive display 418 should utilize a capacitive approach, for example, the touch-sensitive overlay 414 can comprise a capacitive touch-sensitive overlay 414. In such a case the overlay 414 may be an assembly of multiple stacked layers including, for example, a substrate, a ground shield layer, a barrier layer, one or more capacitive touch sensor layers separated by a substrate or other barrier, and a cover. The capacitive touch sensor layers may comprise any suitable material, such as indium tin oxide (ITO).

One or more touches, also known as touch contacts or touch events, may be detected by the touch-sensitive display 418. The control circuit 402 may determine attributes of the touch, including a location of a touch. Touch location data may include data for an area of contact or data for a single point of contact, such as a point at or near a center of the area of contact. Generally speaking, a swipe is a touch that begins at one location on the touch-sensitive display 418 and ends at another location (as when the user places their fingertip on the touch-sensitive display 418 and then drags their fingertip along the surface of the touch-sensitive display 418 before finally lifting their fingertip from that surface).

The portable electronic device includes an operating system 446 and software programs, applications, or components 448 that are executed by the control circuit 402 and are typically stored in a persistent, updatable store such as the memory 410. Additional applications or programs may be loaded onto the portable electronic device through the wireless network 450, the auxiliary I/O subsystem 424, the data port 426, the short-range communications subsystem 432, or any other suitable subsystem 434. The memory 410 may comprise a non-transitory storage media that stores executable instructions which, when executed, causes one or more of the functions, steps, or actions described herein.

As a communication device, a received signal such as a text message, an e-mail message, or web page download is processed by the communication subsystem and input to the control circuit 402. The control circuit 402 processes the received signal for output to the display 412 and/or to the auxiliary I/O subsystem 424. A user may generate data items, for example e-mail messages, that may be transmitted over the wireless network 450 through the communication subsystem. For voice communications, the overall operation of the portable electronic device is similar. The speaker 428 outputs audible information converted from electrical signals, and the microphone 430 converts audible information into electrical signals for processing.

The control circuit 402 further operably couples in this illustrative example to a keyboard 434. This keyboard 434 can comprise, for example, a QWERTY keyboard made up of the above-described keys 101 and that includes a complete set of alphabetic characters along with various numerals, grammatical symbols, and so forth as desired.

Figure 5:
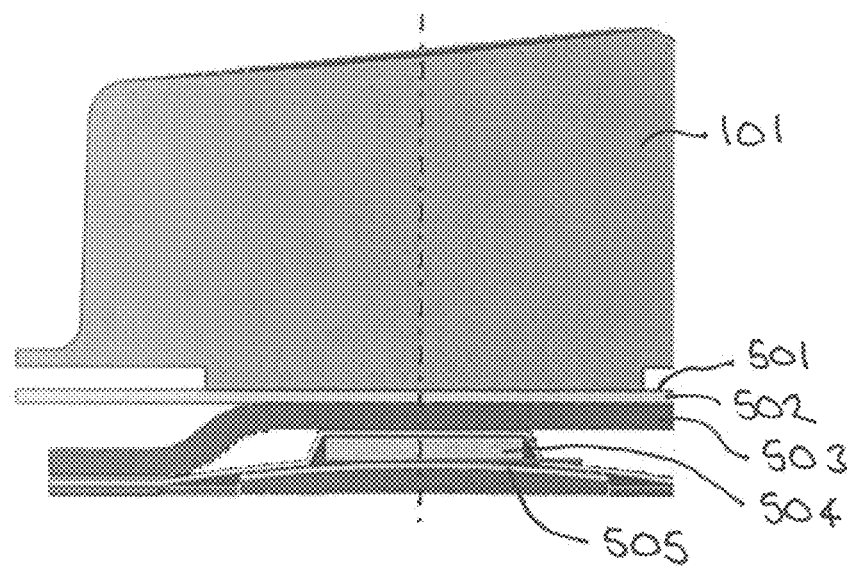
FIG. 5 is an elevational schematic view in accordance with the disclosure.

FIG. 5 provides some further illustrative details as regards one approach to the individual keys of such a keyboard 434.

In this example each key 101 is atop a thermoplastic polyurethane layer 501 that is, by way of example, 0.18 millimeters thick and having a black-colored topside and a matte white-colored bottom side. Next is a thermoplastic polyurethane light guide film 502 having a thickness of about 0.2 millimeters followed by a dome sheet 503, an actuator 504, and a dome switch 505 having a collective height of about 0.493 millimeters. So configured, pressure exerted by a user upon the key 101 will urge the latter towards the actuator 504. The actuator 504 in turn will then contact the dome switch 505 and cause the latter to close (hence sensing and marking the user's assertion of a particular key 101).

The present disclosure may be embodied in other specific forms without departing from its essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. An apparatus comprising:
   a film forming one or more groups of assemblies of keyboard key overlays,
   each group having a plurality of key overlay shapes each sized and dimensioned to overlay a keyboard key;
   each group each including webbing integrally formed from the film and disposed between adjacent key overlay shapes to physically couple together the keyboard key overlays of a group,
   the webbing forming a webbing connection only proximate an upper end or a lower end of coupled key overlays, with a remainder of the webbing between adjacent key overlays cut away or not formed.

2. The apparatus of claim 1 wherein the film and keyboard key are combined via thermoforming and injection molding processes to form-in-place (FIP) keys of a keyboard.

3. The apparatus of claim 1 wherein the connection only at an upper end or a lower end of coupled key overlays comprises no more than ten percent of a space between adjacent key overlays.

4. The apparatus of claim 1 wherein the webbing connections are coaxially disposed relative to each other enabling each keyboard key overlay to pivot about the webbing connection when the group overlays keyboard keys.

5. The apparatus of claim 1 wherein the group includes a film-based flange disposed along an upper or lower edge of the key overlays thereby configured to limit key movement in the +Z direction while permitting key movement in the −Z direction.

6. The apparatus of claim 1 wherein the webbing has an upper surface and a lower surface, the lower surface having a rougher texture than the upper surface.

7. The apparatus of claim 1, wherein the key overlays are sized and shaped to conform to a shape of keyboard keys to be overlaid.

8. The apparatus of claim 1, wherein the connection only at an upper end or a lower end of coupled key overlays is formed by a continuous flange extending along an upper or lower edge of successive keyboard key overlays.

9. The apparatus of claim 1, wherein connections only at an upper end or a lower end of adjacent coupled key overlays pivot when keys overlaid by the key overlays are depressed during use.

10. The apparatus of claim 1, wherein the connection only at an upper end or a lower end of coupled key overlays ensures a correct location of a group of key cap overlays onto corresponding keys during pick and place of a group into an electronic device.

11. The apparatus of claim 1, wherein the film is thermoformed plastic.

12. An apparatus comprising:
    a plurality of groups, each group including a film forming an assembly of a plurality of keyboard key overlays,
    each group having a plurality of key overlay shapes each sized and dimensioned to overlay a keyboard key;
    each group including webbing integrally formed from the film and disposed between adjacent key overlay shapes to physically couple together the keyboard key overlays of a group, and
    the webbing forming a webbing connection only at an upper end or a lower end of coupled key overlays, with a remainder of the webbing between adjacent key overlays cut away or not formed; and
    the groups collectively forming key overlays of at least a portion of the keys of a keyboard of an electronic device.

13. The apparatus of claim 12, wherein the connection only at an upper end or a lower end of coupled key overlays comprises no more than ten percent of a space between adjacent key overlays.

14. The apparatus of claim 12, wherein the webbing connections are coaxially disposed relative to each other enabling each keyboard key overlay to pivot about the webbing connection when the group overlays keyboard keys.

15. The apparatus of claim 12, wherein the connection only at an upper end or a lower end of coupled key overlays is formed by a continuous flange extending along an upper or lower edge of successive keyboard key overlays.

16. The apparatus of claim 12, wherein connections only at an upper end or a lower end of adjacent coupled key overlays pivot when keys overlaid by the key overlays are depressed during use.

17. The apparatus of claim 12, wherein the film is thermoformed polyethylene terephthalate.

* * * * *